(12) United States Patent
Vempati

(10) Patent No.: US 6,790,363 B2
(45) Date of Patent: Sep. 14, 2004

(54) METHOD OF TREATING ARSENIC-CONTAMINATED WATERS

(75) Inventor: Rajan K. Vempati, Plano, TX (US)

(73) Assignee: ChK Group, Inc., Plano, TX (US)

( * ) Notice: Subject to any disclaimer, the term of this patent is extended or adjusted under 35 U.S.C. 154(b) by 217 days.

(21) Appl. No.: 09/911,021

(22) Filed: Jul. 24, 2001

(65) Prior Publication Data

US 2003/0116504 A1 Jun. 26, 2003

(51) Int. Cl.$^7$ .............................. C02F 1/28; C02F 1/58; C02F 1/72
(52) U.S. Cl. ...................... 210/668; 210/679; 210/681; 210/747; 210/758; 210/911
(58) Field of Search .................. 210/668, 669, 210/681, 758, 911, 679, 747

(56) References Cited

U.S. PATENT DOCUMENTS

| | | | |
|---|---|---|---|
| 3,782,076 A | 1/1974 | Carr et al. ..................... 55/74 |
| 3,812,653 A | 5/1974 | Massoth et al. ............... 55/68 |
| 4,260,487 A | 4/1981 | Gruett ......................... 210/190 |
| 4,578,256 A | 3/1986 | Nishino et al. ............. 423/210 |
| 4,765,892 A | 8/1988 | Hulbert et al. .............. 210/290 |
| 4,855,115 A | 8/1989 | Imanari et al. ............. 423/239 |
| 4,869,735 A | 9/1989 | Miyazawa et al. ............. 55/72 |
| 5,078,889 A | 1/1992 | Higgins et al. ............. 210/683 |
| 5,312,608 A | 5/1994 | Hayasaka et al. ........ 423/213.5 |
| 5,330,560 A | 7/1994 | Chao et al. ..................... 95/95 |
| 5,330,658 A * | 7/1994 | Grant et al. ................ 210/717 |
| 5,447,653 A | 9/1995 | Yanagita et al. ............ 252/179 |
| 5,457,268 A | 10/1995 | Greene et al. .............. 588/207 |
| 5,518,528 A | 5/1996 | Tom et al. ..................... 95/103 |
| 5,591,346 A * | 1/1997 | Etzel et al. ................. 210/668 |
| 5,908,557 A * | 6/1999 | Smith et al. ................ 210/668 |

FOREIGN PATENT DOCUMENTS

| | | | |
|---|---|---|---|
| EP | 0057514 | 8/1982 | ............ C07C/2/86 |
| JP | 363145241 A | 6/1988 | ................... 502/74 |
| JP | 402233138 A | 9/1990 | ................. 424/443 |
| WO | WO 91/17828 | 11/1991 | ............ B01J/29/06 |

* cited by examiner

*Primary Examiner*—Ivars C. Cintins
(74) *Attorney, Agent, or Firm*—Charles D. Gunter, Jr.

(57) ABSTRACT

The present invention is directed to an adsorbent for removing arsenic species from ground water and/or surface water systems. Such adsorbent removes both As(III) and As(V), thereby providing potable water. Also provided is a method and/or device (e.g., filter) for removing arsenic species from contaminated waters utilizing such adsorbent.

11 Claims, 12 Drawing Sheets

METHOD OF TREATING ARSENIC-CONTAMINATED WATERS

FIELD OF THE INVENTION

The present invention relates to an adsorbent for arsenic species and a method and/or device for removing arsenite (As(III)) and arsenate (As(V)) from ground water and surface water systems. Particularly, the present invention relates to natural zeolite coated with nanophase Mn—Fe oxides (NZNPF), and a method and/or device for removing As(III) and As(V) from arsenic-contaminated waters using NZNPF.

DESCRIPTION OF THE PRIOR ART

High concentrations of arsenic in drinking water result from either anthropogenic contamination or weathering of naturally occurring subsurface materials. The two most important anthropogenic sources of arsenic are agricultural chemicals and wood preservatives. Furthermore, use of arsenic species in manufacturing of sulfuric acid and leather tanning have resulted in significant contamination. In the geological occurrence, arsenic is found at high levels in primary sulfide minerals, such as arsenopyrite (FeAsS), pyrite ($FeS_2$), pyrrhotite ($Fe_{1-x}S$), orpiment ($As_2S_3$) and realgar (AsS). In addition, its ionic and valence states allow arsenic to substitute in trace amounts for many elements in silicate rock-forming minerals (Onken and Hossner, 1996). The chemical similarity between arsenate and phosphate lead to anion solid solutions between such minerals arsenate pyromorphite ($Pb_5(PO_4)_3Cl$) and mimetite ($Pb_5(AsO_4)_3Cl$ (Klein and Hurlbut, 1985).

In surface water systems, arsenic can be dissolved either directly from weathering of geological materials (Baker et al, 1998) or through mixing with high-arsenic geothermal waters (Wilkie and Hering, 1998). In groundwater systems, arsenic can also be derived from the dissolution of As-bearing iron oxides in unconsolidated aquifer materials (Korte, 1991). Aqueous arsenate concentrations are controlled by anion exchange and coprecipitation with Fe and Mn oxyhydroxides and are therefore a function of Eh and pH. Arsenate anion exchange dynamics are analogous to phosphate with competition for exchange sites generally favoring phosphate over arsenate. As(III) exists as a neutral $As(OH)_3$ species and therefore is mobile under most conditions. Hence, As(III) has to be oxidized to As(V) which will result in formation of arsenate. The arsenate ion can then be adsorbed on to amphoteric Fe oxides.

In 1981, the US Environmental Protection Agency (USEPA) Region I office released a report examining the occurrence of elevated arsenic in the ground waters of Hudson, N.H. (EPA, 1995). Various government reports attributed the arsenic source to either a contaminant plume from either hazardous waste or pesticide source or the oxidation and release of arsenic from natural sulfide minerals, such as arsenic-containing pyrite or arsenopyrite in the bedrock aquifer materials. A similar problem was encountered in towns of Buxton and Hollis, Me. (Marvinney et al., 1994). There appeared to be no correlation with any particular geological unit although water from bedrock wells contained more arsenic than water from surficial wells. Furthermore, it was reported that 10% of the wells in the state contained arsenic >50 ppb. The US Geological Society (USGS) has recently compiled the results of arsenic water analyses throughout Massachusetts, Rhode Island, Vermont, New England, New Hampshire and Maine as a part of Water Quality Assessment (Ayotte et al., 1999). Of the 800 public and 190 private wells analyzed, 23% of the wells contained arsenic above the detection limit of 5 ppb and 10 to 15% of the wells contained >50 ppb arsenic levels.

As(III) in the concentration of 100 ppb is extremely toxic and may cause skin cancer and neurological damage. This is further illustrated in a recent report on arsenic poisoning in groundwater in India and Bangladesh. Tens of thousands in Bangladeshi villages are suffering severe health effects with skin legions, and warts and sores covering their hands and feet (New York Times, 1999).

Based on USEPA, the currently best available technologies for As(V) removal are summarized as follows along with their disadvantages listed in parenthesis: Ion exchange resins (sulfate concentration has to be <50 mg $L^{-1}$ to be effective; and resin is expensive); Activated alumina (performance is dependant on concentration of total dissolved sulfate and pH; and it is ineffective at high pH); Reverse osmosis (expensive; and concentrated waste stream is produced); Modified coagulation/filtration (it needs pre-oxidation for As(III) removal; and alum is ineffective at high pH); Modified lime softening (limited As removal at pH<10); Electrodialysis reversal (EDR) (expensive; creates large waste stream); and Oxidation/filtration (requires the use of Fe(II) to oxidize As(III), but the Fe to As ratio of 50 is critical for efficient removal). All these technologies are good only for As(V) and very little data is available for As(III). There is an urgent need to develop a low-cost method and/or device for the purpose of reducing As(III) and As(V) levels for supplying potable water in problematic areas.

SUMMARY OF THE INVENTION

The present invention provides an adsorbent for removing an arsenic species from contaminated waters. Particularly, the adsorbent is an Fe- and Mn-oxide. Representative examples include Mn-ferrihydrite, Si-ferrihydrite, Si-free birnessite, Si-birnessite, and natural zeolite coated with nanophase Mn—Fe oxides.

Specifically, for natural zeolite coated with nanophase Mn—Fe oxides (NZNPF), Mn-substituted nanophase Fe oxide removes both As(III) and As(V) from contaminated waters, wherein Mn(IV) oxidizes As(III) to As(V), and nanophase Mn—Fe oxide adsorbs As(V) and released Mn(II) and Fe ions. The removal is effective at all pHs (4 to 9) and the adsorption occurs in 30 min. Additionally, the amount of Mn and Fe released to water is decreased significantly, thus maintaining the aesthetics of water.

Also provided is a method for removing arsenic from contaminated waters by utilizing natural zeolite coated with nanophase Mn—Fe oxides. This method provides better water flow rate due to less oxides, which results in low headloss and reduced clogging of fixed bed filter media. For surface water treatment plants, zeolite assists in settling the particles in settling ponds.

Still provided is a filter system for removing arsenic from contaminated waters. Such filter system comprises a filter column with natural zeolite coated with nanophase Mn—Fe oxides (NZNPF), particularly, natural zeolite coated with 1% nanophase Mn—Fe oxides. After filtration, the resulting waters comprise less than 3 ppb of As(III) and/or As(V), which is below the instrument detection limit. This system may be used for treating both ground and surface waters.

Further provided is a method for removing arsenic having various valence states from arsenic contaminated waters by oxidizing the arsenites having lower valence states to arsenates having higher valence states; and then removing the oxidized and native arsenates having higher valence states from the waters. Other Mn-containing oxides than NZNPF, such as birnessite, Si-birnessite, and Mn-ferrihydrite, oxidize arsenite having lower valence states to higher valence states, and Fe-containing oxides, such as Si-ferrhydrite, and Mn-ferrihydrite, adsorb and subsequently remove the oxidized and native arsenates having higher valence states. This method may be used for treating both ground and surface waters.

Other Fe- and Mn-oxides may also be used for low-cost well-head filters for providing safe potable water. Such filter may be a single media filter or a dual-media filter. For dual-media filter, two absorbents are used: first adsorbent in the upper side of the filter column and second adsorbent in the bottom side of the filter column. The first adsorbent oxidizes As(III) to As(V), and the second adsorbent adsorbs the oxidized and native As(V) and released Mn(II) and Fe ions.

Additional objects, features and advantages will be apparent in the written description which follows.

DETAILED DESCRIPTION OF THE INVENTION

Figure 1:
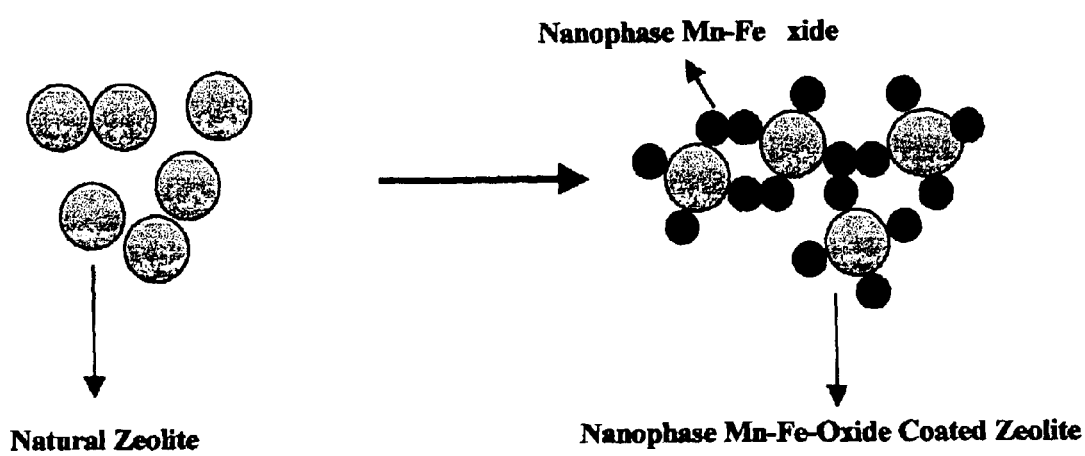
FIG. 1 is a schematic illustration of natural zeolite and zeolite coated with nanophase Mn—Fe oxide.

The present invention is directed to an adsorbent for removing arsenic (both As(III) and As(V)) from contaminated waters, particularly, the adsorbent is an Fe- and Mn-oxide. Examples of adsorbent include Mn-ferrihydrite, Si-ferrihydrite, Si-free birnessite, Si-birnessite, and natural zeolite coated with nanophase Mn—Fe oxides (NZNPF). Specifically, NZNPF comprises ~0.25%–10% Fe oxide. More specifically, NZNPF comprises 1% Fe oxide.

The present invention is also directed to a method of producing NZNPF by producing Fe oxide solution from Fe-containing compound; adding Mn-containing compound to the Fe oxide solution to obtain Fe—Mn solution; adding natural zeolite to the Fe—Mn solution to form a mixture; filtering the mixture; and drying the filtered product. A specific example of Fe-containing compound is $FeCl_3$, and the example for Mn-containing compound is $MnCl_2$. Preferably, the natural zeolite added to the Fe—Mn solution has a particle size in the range of from about 0.1 mm to about 1.4 mm. Still preferably, the above method may further comprise the steps of adjusting the pH of the mixture to about 7.0 using NaOH, and equilibrating the solution before the filtration; and/or comprises the step of washing the filtered product with distilled water to remove excess salts before drying.

The present invention is further directed to a method of removing As(III) and As(V) from arsenic-contaminated waters. This method comprises the steps of contacting the arsenic-contaminated waters with NZNPF, wherein Mn oxide in NZNPF oxidizes As(III) to As(V); then adsorbing and removing the oxidized and native As(V) from the waters by Fe oxide in NZNPF. By doing so, the resulting waters comprise less than 3 ppb of As(III) and/or As(V), which is below instrument's detection limit. This adsorption works at the pH range of from about 4 to about 9. This method works for treating both ground and surface waters.

One of the applications of NZNPF is in a filtration unit used for removing As(III) and As(V) from arsenic-contaminated waters. This filter system comprises a filter column with NZNPF. Preferably, NZNPF comprises 1% Fe oxide.

Other Fe- and Mn-oxides may also be used for treating arsenic-contaminated waters. The present invention is further directed to a method of removing arsenic having various valence states from arsenic-contaminated waters. This method comprises the steps of oxidizing the arsenites having lower valence states to arsenates having higher valence states; and removing the oxidized and native arsenates having higher valence states from the waters. In detail, arsenites having lower valence states are oxidized by a Mn-containing Fe oxide, whereas the oxidized and native arsenates are adsorbed and subsequently removed by Mn-containing Fe oxide. The adsorption works at the pH range of from about 4 to about 9. This method provides potable waters with less than 3 ppb of As(III) and/or As(V) and works well for treating both ground and surface waters.

Similarly, other Fe- and Mn-oxides may also be used for low-cost well-head filters for providing safe potable water. Such filter may be a single media filter or a dual-media filter. For dual-media filter, two absorbents are used: first adsorbent in the upper side of the filter column and second adsorbent in the bottom side of the filter column. The first adsorbent oxidizes As(III) to As(V), and the second adsorbent adsorbs the oxidized and native As(V) and released Mn(II) and Fe ions. For example, when Mn-ferrihydrite is ineffective in oxidizing As(III) and adsorbing the As(V), a dual-media filter is proposed. This dual-media filter may contain birnessite or Si-birnessite (to oxidize As(III) to As(V)) in the upper side of the column and Si-ferrihydrite (to adsorb As(V)) in the bottom of the column. In another case, if As(V) is present in the drinking water without significant As(III), then a single filter made up of Si-ferrihydrite would suffice. The point-of-use filter design will be similar to that available for individual households in USA, with a replaceable filter cartridge.

The following examples are given for the purpose of illustrating various embodiments of the invention and are not meant to limit the present invention in any fashion.

EXAMPLE 1
Mn-ferrihydrite with Mn/(Mn+Fe) Molar Ratio of 0.1 or 0.2

To a 1000-mL beaker containing 50 mL of 0.25 M $MnCl_2$, 100 mL of 0.5 M $FeCl_3$ (for Mn/(Mn+Fe) molar ratio of 0.1) or 150 mL of 0.66 M $FeCl_3$ (for Mn/(Mn+Fe) molar ratio of 0.2) was added and solutions mixed using a magnetic stirrer. After five minutes, 200 mL of 7 M NaOH was added to the solution. The precipitate was allowed to sit in the beaker for one hour. Subsequently, the Mn-ferrihydrite sample was centrifuged. The first supernatant was saved to determine the NaOH concentration and/or its consumption. The precipitate was further washed with deionized water five more times and dialyzed to remove excess of salts. The freeze-dried sample was used for characterization.

EXAMPLE 2
Si-Ferrihydrite with Si/Fe Molar Ratio of 0.04

To a 1000 mL beaker containing 100 mL of 1 M $FeCl_3$, 100 mL of 0.04 M $Na_2SiO_3$ was added and solutions mixed using a magnetic stirrer. The pH of the solution was raised to 8.2, which resulted in formation of precipitate. The precipitate was incubated for a day; subsequently, the sample was centrifuged and dialyzed to remove excess of salts. The freeze-dried sample was used for characterization.

EXAMPLE 3
Si-Free Birnessite

To a 1000-mL beaker containing 200 mL of 0.5 M $MnSO_4$, 250 mL of 5.2 M NaOH was added rapidly and the resulting black precipitate was agitated using a magnetic stirrer. Oxygen was immediately passed through the precipitate at a rate of 2 L $min^{-1}$ using a fritted glass tube to produce a stream of small bubbles. After 5 h, the black suspension was centrifuged at 10,000 rpm for 30 min. The first supernatant was saved to determine the NaOH concentration and/or its consumption. The sample was further washed with deionized water five times and dialyzed. The freeze-dried sample was used for characterization.

EXAMPLE 4
Si-Birnessite with Si/Mn Molar Ratio Ranging from 0.32 to 0.68

Silica was added to the birnessite synthesis, to make it poorly crystalline so that high surface area would provide more interaction of Mn(II) with As(III) resulting in higher oxidation of the latter ions. To a 1000-mL beaker containing 200 mL of 0.5 M $MnSO_4$, 250 mL of 5.2 M NaOH containing appropriate amount of dissolved $Na_2SO_3 \cdot 5H_2O$ was added rapidly to achieve the desired Si/Mn molar ratio and the resulting black precipitate was agitated using a magnetic stirrer. Oxygen was immediately passed through the precipitate at a rate of 2 L $min^{-1}$ using a fritted glass tube to produce a stream of small bubbles. After 5 h, the black suspension was centrifuged at 10,000 rpm for 30 min. The first supernatant was saved to determine the NaOH concentration and/or its consumption. The sample was further washed with deionized water five times and dialyzed. The freeze-dried sample was used for characterization.

EXAMPLE 5
Natural Zeolite Coated with Nanophase Mn—Fe Oxides

The natural zeolite is composed predominantly of clinoptilolite. The samples were from the Tilden, Tex., and Socorro, N. Mex. deposits and were supplied by Zeotech Corporation, Peralta, N. Mex. Clinoptilolite belongs to the zeolite structure group of VII with a complex secondary blocking unit of 4-4-1. The typical formula of the zeolite is $(Na_2, K_2) Al_2O_3 \cdot 10SiO_2 \cdot 8H_2O$ with Si/Al ratios ranging from 4 to 5 and a density of 2.16 g $cc^{-1}$. It has a monoclinic symmetry and the unit cell dimensions are a=0.741 nm, b=1.789 nm and c=1.585 nm. Clinoptilolite is stable up to 973 K. The major application of this zeolite is for odor control and stabilization and solidification of heavy metals. FIGS. 1A and 1B schematically demonstrate natural zeolite (FIG. 1A) and zeolite coated with nanophase Mn—Fe oxide (FIG. 1B). A synthetic zeolite can be used to replace the natural one.

EXAMPLE 6
Natural Zeolite Coated with 5% or 10% Nanophase Mn—Fe Oxides

To a 500 mL polypropylene beaker, a known amount of $FeCl_3$ was added to produce a 5% or 10% of Fe oxide coating on the natural zeolite. Then a known amount of $MnCl_2 \cdot 4H_2O$ was added to the Fe solution to produce a Mn/(Mn+Fe) molar ratio of 0.1. The solution was mixed thoroughly. Subsequently, 25 g of zeolite, with a particle size in the range of 0.1 mm to 1.4 mm, was added to Fe—Mn solution. A larger particle size was used to get a good water flow rate. The suspension was stirred using a magnetic stirrer and after approximately 30 min, the pH was slowly raised to about 6.8 using 7.0 M NaOH. The suspension was equilibrated overnight and the slurry washed thrice by centrifuging at 10,000 rpm for 30 min. The final sediment was dialyzed to remove excess salts. The samples were freeze-dried.

EXAMPLE 7
Natural Zeolite Coated with 0.25% and 1% Nanophase Mn—Fe Oxides

The coating was done differently compared to the above samples. This is to simulate synthesis conditions closer to commercial operations. The advantages include the following: equilibration time is reduced to 30 min from 18 hrs; amount of Fe and Mn salts used are significantly reduced; amount of base used to raise pH to 7 is decreased significantly, thus number of washing to remove salts is reduced; water flow through the oxide coated material is enhanced so that it can be reduced in the fixed bed filtration system which is commonly used in treating contaminants in groundwater system; manufacturing costs are considerably reduced compared with 5 and 10% coated zeolites and significantly lowered compared to pure Fe- and Mn-oxides.

To synthesize, a known amount of 2.43 M $FeCl_3$ was added to a 500 mL polypropylene beaker to get 0.25% and 1% Fe oxide coating on the natural zeolite. Then a known amount of $MnCl_2$ was added to the Fe solution to get a Mn/(Mn+Fe) molar ratio of 0.1. The solution was mixed thoroughly. Subsequently, 25 g of zeolite, with a particle size in the range of 0.1 mm to 1.4 mm, was added to the Fe—Mn solution. The suspension was stirred using a magnetic stirrer and after approximately 30 min, the pH of it was slowly raised to about 7 using NaOH. The sample was equilibrated for 30 min, and then vacuum filtered using Whatman 41 filter paper. The resulting material was washed several times with distilled water to remove excess salts and the filtered product was air dried.

EXAMPLE 8
Characterization of Oxides

The samples were characterized using x-ray diffraction (XRD), Fourier transformed infrared spectroscopy (FTIR), thermogravimetric analysis (TGA) and scanning electron microscopy imaging. The results are summarized below.

X-ray diffraction (XRD): The x-ray diffraction pattern of the Mn-ferrihydrite and Si ferrihydrite samples did not show any peaks but a broad halo was observed around 0.25 nm indicating the amorphous nature of these materials. The Si-free birnessite samples exhibited several peaks (See Table 1); whereas, in the Si-containing birnessite a few of these peaks were missing indicating poor crystallinity of the product (Lou et al., 2000).

TABLE 1

X-ray diffraction pattern of synthetic birnessite

| Birnessite | Si-Free Birnessite nm | 0.68 Si/Mn M Birnessite | hkl |
|---|---|---|---|
| 0.714 | 0.714 | 0.714b | 002 |
| 0.356 | 0.356 | 0.357b | 004 |
| 0.252 | 0.252 | — | 060 |
| 0.242 | 0.242 | 0.243b | 330 |
| 0.221 | 0.221 | — | 304 |
| 0.215 | 0.215 | — | 235 |
| 0.214 | — | — | 260 |
| 0.186 | 0.186 | — | 440 |
| 0.181 | 0.181 | — | 414 | b = broad peak.

Fourier transformed infrared spectroscopy (FTIR): The Mn-ferrihydrite and Si-ferrihydrite samples did not show any IR bands indicating that the oxides were amorphous and did not contain any poorly-crystalline and/or crystalline Fe oxide phases. The IR bands of birnessite samples are given in Table 2. The 0.68 Si/Mn molar ratio birnessite did not exhibit any characteristic bands.

TABLE 2

Characteristic infrared bands of birnessite

| Sample | Infrared Band Position ($cm^{-1}$) | | | | | |
|---|---|---|---|---|---|---|
| Birnessite (Reference) | 3440 b | 1630 b | 710† | 630 | 510 m | 480 m |
| Si-free Birnessite | 3440 b | 1630 b | — | 640 s | 520 b | 480 b |
| 0.68 Si/Mn M ratio Birnessite | — | — | — | — | — | — |

Reference from Golden et al. (1986)
†Luo et al. (2000)

Thermogravimetric analysis (TGA): The thermogravimetric analysis (TGA) of the oxides are given in Table 3. The TGA graph of the Mn-ferrihydrite and Si-ferrihydrite did not show a sharp dehydroxylation slope but a gradual weight loss was observed (See Appendix). This study also confirms the amorphous nature of the materials. In the case of Si-free birnessite and 0.15 Si/Mn molar ratio birnessite, a sharp slope was observed at 373 K and 393 K, respectively. For both samples, weak and fairly discernable slopes were observed at 673 K and 853 K. This is likely due to transformation of birnessite to disordered birnessite at temperature in the range of 373 to 673 K and to cryptomelane at 853 K (Golden et al., 1986).

TABLE 3

Thermogravimetric analysis of synthesized oxides

| Sample | Weight Loss Temperature (K) | Percent Weight Loss |
|---|---|---|
| 0.1 $Mn_s$ Ferrihydrite | 453 | 12.56 |
| 0.2 $Mn_s$ Ferrihydrite | 453 | 12.08 |
| 0.04 Si/Fe M Ferrihydrite | 423 | 15.51 |
| Si-Free Birnessite | 373, 673†, 853 | 18.74 |
| 0.15 Si/Mn M Birnessite | 393, 673†, 853 | 19.88 |
| 0.25% NZNPF | 463, 898† | 11.90 |
| 1% NZNPF | 463, 898† | 11.86 |
| 5% NZNPF | 463, 898† | 15.30 |
| 10% NZNPF | 463, 898† | 17.77 |

$Mn_s$ = Mn(Mn + Fe) Mole Fraction
† = Weak slope
NZNPF = natural zeolite coated with nanophase Mn-Feoxide (the percent refers to Fe content added to zeolite)

EXAMPLE 9
Adsorption Study

Sample preparation: Birnessite, Mn- and Si-ferrihydrite, and natural zeolite coated with nanophase Mn—Fe oxide samples were either freeze-dried or oven dried at 373° C. prior to their use in the oxidation and adsorption experiments. The As(V) standard was obtained from Merck; whereas, the As(III) standard was obtained from Alfar Aesar. As(III) and As(V) standards were diluted with deionized distilled water to make 50 ppb and 1000 ppb solutions. The pH of these solutions was adjusted by adding a 0.5 M NaOH solution.

Experimental conditions: 2, 4 or 8 mg of solid material was weighed into a 15 ml centrifuge tube. 10 milliliters of a 50 ppb or 1000 ppb, depending on the study, As(III) or As(V) solution was used. The pH was adjusted to 4, 5, 6, 7 and 8 using 0.5 M NaOH. The suspension was then sonicated for 10 sec and shaken gently on a shaker table for 30 min. For the adsorption study the experiment was terminated after 30 min and for the kinetics study after 1, 5, 10, 20 and 30 min. All experiments were performed at room temperature 25° C. (±5). The sample solution was filtered through a 0.45-$\mu$m polypropylene filter and analyzed immediately. The pH was measured at the beginning and the end of each experiment and no attempt was made to control the suspension pH. All experiments were repeated in triplicate.

Figure 2:
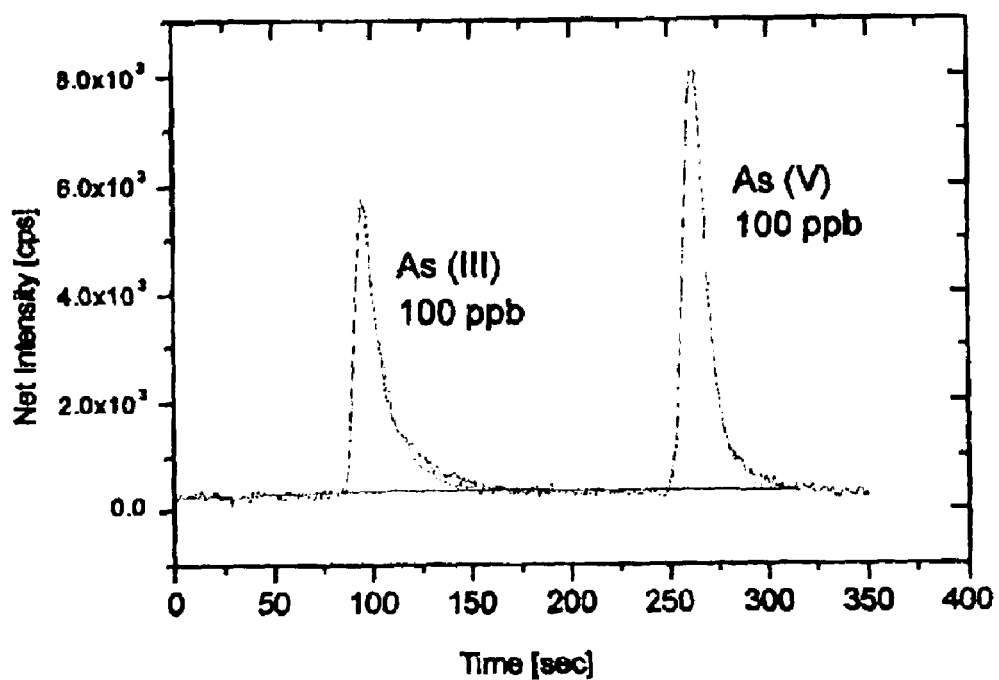
FIG. 2 is a chromatogram of As(III) and As(V) separation using high pressure liquid chromatography (HPLC) coupled with ICP-OES.

Analytical methods: As(V), Fe, Mn and Si were determined by ICP-OES (Inductively Coupled Plasma-Optical Emission Spectrometer) coupled with an ultrasonic nebulizer with detection limits of 3 ppb for As, 5 ppb for Fe and Si and 1 ppb for Mn. Arsenic species analysis was performed with an IC-USN-ICP-OES system (Ion chromatography-ultrasonic nebulizer-inductively coupled plasma-optical emission spectrometer). The HPLC uses an AS4A column with a sodium carbonate/sodium bicarbonate eluent at a flow rate of 1.5 ml min$^{-1}$. The injected sample volume is 0.5 ml. By using an ultrasonic nebulizer the detection limits for As(III) and As(V) have been lowered to 3 ppb, respectively (FIG. 2).

EXAMPLE 10

Modified TCLP on the Material

Toxicity Characteristics Leaching Procedue (TCLP) test was conducted to determine whether the As-containing material can be disposed of safely in a landfill using the TCLP-Method 1311 of SW-846. The extracting solution was prepared by mixing 11.4 mL of 17.4 M glacial acetic acid to 1 L of deionized water containing 128.6 mL of 1 M NaOH, and the pH was adjusted to 4.93. The procedure adopted was as follows: to a 5 g of natural zeolite coated with 1% Mn-Feoxide sample and treated with 10 mL of 50 ppb As for 30 min, was equilibrated with 100 mL of extracting solution for 18 hrs in an orbital shaker, centrifuged, decanted, and filtered before analysis.

EXAMPLE 11

As(III) and A(V) Adsorption Results

Figure 3:
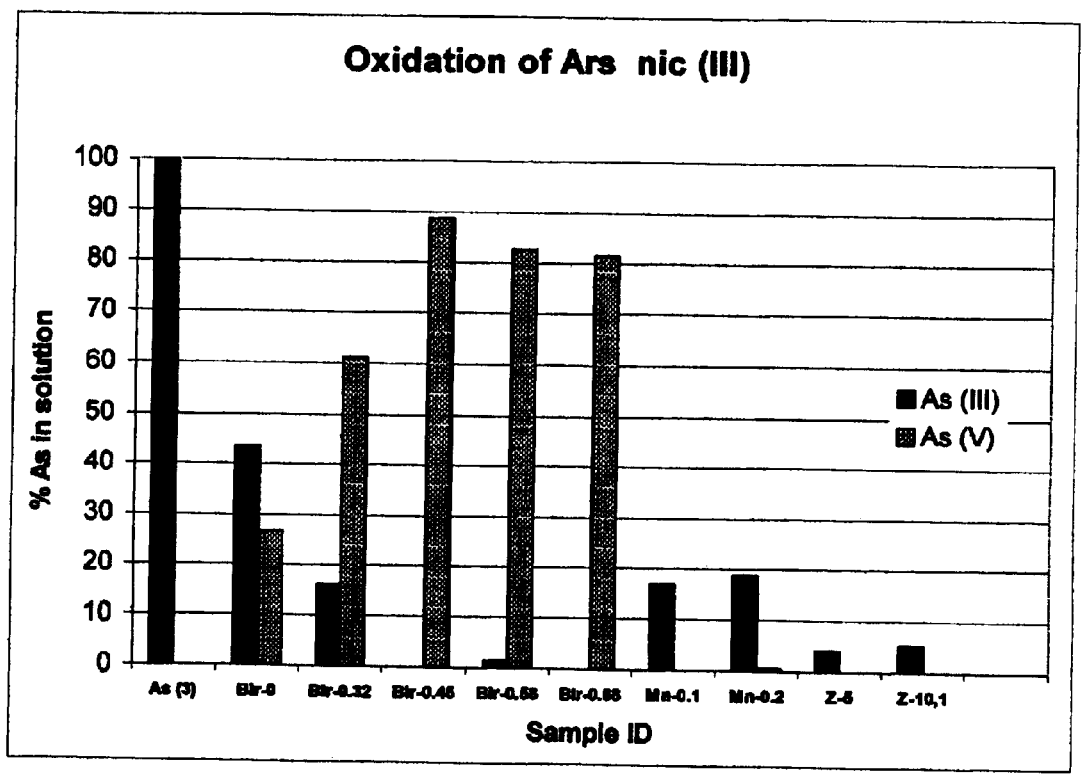
FIG. 3 shows a plot of percent As(III) and As(V) present in solution after reacting As(III) with various Mn-minerals. (Birnessite labeled according to Si/Mn ratios; Mn-0.1 and Mn-0.2 are Mn-ferrihydrite with Mn/(Mn+Fe) molar ratios of 0.1 and 0.2, respectively; Z-5 and Z-10 are natural zeolite coated with 5% and 10% nanophase Mn—Fe oxides).

Various materials were tested for arsenic adsorption at different pH and various solution concentrations and oxide amounts. The results are summarized below:

Mn-containing oxide reacted with 1000 ppb As(III): This study was conducted to oxidize As(III) to As(V) by various Mn contanining oxides used in the study, i.e., birnessite, Si-birnessite, Mn-ferrihydrite and natural zeolite coated nanophase Mn-Feoxide (NZNPF). Table 4 and FIG. 3 show that both the 5% and 10% NZNPF were effective in adsorbing As(III) from the solution; whereas, Si-containing birnessite samples were better oxidizers of As(III) to As(V) compared to Si-free birnessite. This is due to the fact that the addition of Si into birnessite structure resulted in formation of poorly-crystalline birnessite particles that lead to increased surface areas. Therefore, more Mn(IV) sites were accessible to As(III) resulting in increased oxidation. Whereas, in case of NZNPF, it is likely that the Mn(IV) is oxidizing the As(III) to As(V), and the Fe oxide sites are adsorbing the released anionic arsenate by ligand exchange mechanisms. Additionally, the released Mn(II) and Fe ions were adsorbed by NZNPF.

TABLE 4

As(III) oxidation and sorption by Mn-containing minerals.[†]

| Sample | As(III) ppb | % As(III) | As(V) ppb | % As(V) | As Adsorbed mg g$^{-1}$ |
|---|---|---|---|---|---|
| 0.0 Birnessite[‡] | 406 | 43 | 301 | 31.5 | 0.31 |
| 0.32 Si Birnessite[‡] | 137 | 14 | 671 | 70.2 | 0.19 |
| 0.45 Si Birnessite[‡] | <3 | 3 | 873 | 91.3 | 0.10 |
| 0.58 Si Birnessite[‡] | 27 | 3 | 815 | 85.3 | 0.14 |
| 0.68 Si Birnessite[‡] | 0 | <3 | 819 | 85.7 | 0.17 |
| 0.1 Mn Ferrihydrite[§] | 143 | 15 | <3 | <3 | 1.01 |
| 0.2 Mn—Ferrihydrite[§] | 180 | 19 | 12 | 0.0 | 0.96 |
| 5% Mn—Fe |  |  |  |  |  |

TABLE 4-continued

As(III) oxidation and sorption by Mn-containing minerals.[†]

| Sample | As(III) ppb | % As(III) | As(V) ppb | % As(V) | As Adsorbed mg g$^{-1}$ |
|---|---|---|---|---|---|
| Coated Zeolite[¶] 10% Mn-Fe | 41 | 4.2 | <3 | 0.0 | 1.14 |
| Coated Zeolite[¶] | 49 | 5.1 | <3 | 0.0 | 1.13 |

[†]10 mL of 956 ppb of As(III) treated with Mn-containing minerals at pH 8 and samples shaken for 30 min.
[‡]Si/Mn molar ratios
[§]Mn/(Mn + Fe) molar ratio
[¶]Natural zeolite coated with 5% and 10% Fe maintaining Mn/(Mn + Fe) molar ratio to 0.1.

Figure 4:
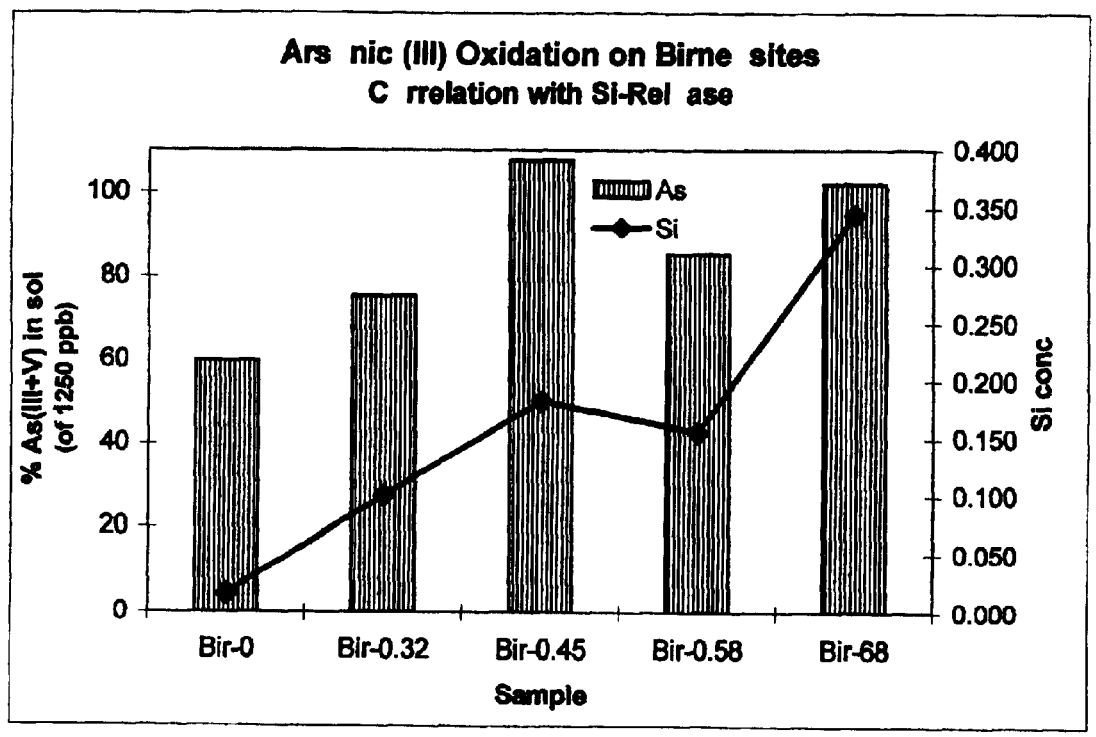
FIG. 4 shows a plot of percent As(III) and As(V) present in the solution versus Si-released from Si-containing birnessite (Birnessite labeled according to the Si/Mn molar ratios).

Furthermore, it is interesting to note that in Si-containing birnessite samples, even though higher amounts of As(III) was oxidized to As(V), there was little adsorption of As(V) (Table 5). One would have expected that arsenate ions to replace silicate ions but this is not the case (FIG. 4). It is likely that Si(IV) is intimately associated with Mn(IV) and the release of Mn(II) due to the redox dissolution results in ejection of Si into the solution.

TABLE 5

As(III) oxidation and sorption by birnessite samples with different Si/Mn molar ratio[†]

| Sample Si/Mn[§] | Solution As[‡] ppb | % As in Solution | Solution Si ppb | As Adsorbed mg g$^{-1}$ | Si Desorbed mg g$^{-1}$ |
|---|---|---|---|---|---|
| 0 | 50 | 59 | 20 | 2390 | 80 |
| 0.32 | 310 | 75 | 100 | 1230 | 400 |
| 0.45 | — | 100 | 180 | — | 920 |
| 0.58 | 190 | 85 | 150 | 90 | 730 |
| 0.68 | — | 100 | 340 | — | 1640 |

Figure 5:
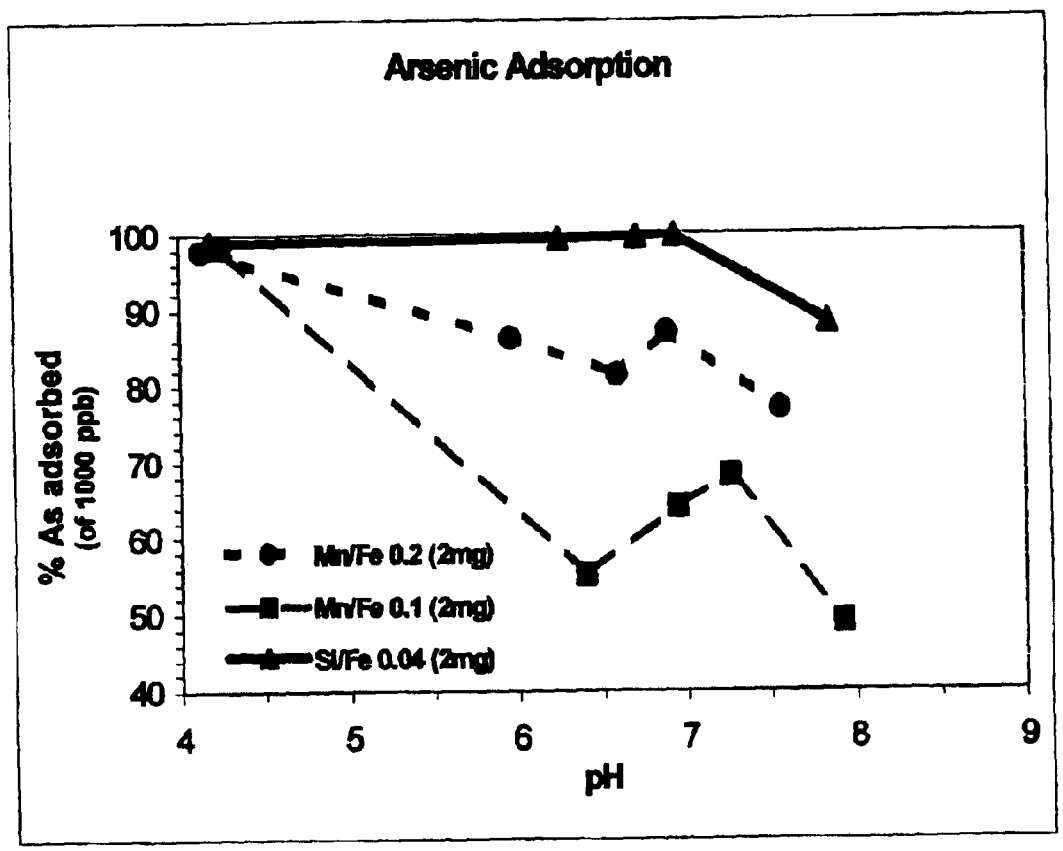
FIG. 5 shows a plot of percent arsenic adsorption versus pH. The (▲) represents 0.04 Si/Fe molar ratio ferrihydrite, and (■) and (●) represent 0.1 and 0.2 Mn/(Mn+Fe) molar ratio ferrihydrite samples, respectively.

[†]10 mL of 1250 ppb of As(III) treated with birnessite samples at pH 8.3 and samples shaken for 30 min.
[‡]Total arsenate analyzed
[§]molar ratios
— Below instrument detection limit of <3 ppb As adsorption and pH dependency of As(V): This study was designed to understand the As(V) adsorption at the pH range of 4 to 8 on the Mn- and Si-ferrihydrite samples (Table 6 and FIG. 5). Based on the previous experiment, birnessite with and without Si were excluded from the study as they did not contribute to As adsorption. The study was conducted using 2 mg of samples, and the sample shaken for 30 mins using 10 mL of 1,250 ppb As. Si-ferrihydrite sample was found to be a superior adsorbent for As(V) at all the pH ranges studied and 100% of As(V) was adsorbed up to pH 7 and it decreased to 90% at pH 8. Mn ferrihydrite with Mn/(Mn+Fe) molar ratio of 0.2 was found to be a better adsorbent compared to Mn ferrihydrite with Mn/(Mn+Fe) molar ratio of 0.1. At all pHs, the adsorption of As(V) resulted in release of Fe and Mn into solution. This is significant, as the Mn and Fe in the treated drinking water have to be monitored so that the maximum contaminant levels (MCL) for Fe and Mn are not exceeded. The current levels are 300 ppb and 50 ppb for Fe and Mn, respectively.

TABLE 6 pH versus arsenate (V) Adsorption on oxides and Fe and Mn released into solution[†]

| | pH | | | | | | | | | | | |
|---|---|---|---|---|---|---|---|---|---|---|---|---|
| | 4.1 | | | 6.0 | | | 7.0 | | | 7.5 | | |
| Sample | As | Fe | Mn | As | Fe | Mn | As | Fe | Mn | As | Fe | Mn |
| | | | | | | ppb | | | | | | |
| 0.1 Mn-Ferrihydrite[‡] | 20 | 12 | 260 | 540 | 260 | 100 | 390 | 350 | 80 | 620 | 380 | 70 |
| 0.2 Mn Ferrihydrite[‡] | 30 | 60 | 150 | 170 | 60 | 60 | 160 | 340 | 40 | 280 | 200 | 20 |
| 0.04 Si-Ferrihydrite[§] | 10 | 410 | 30 | <3 | 240 | 20 | −<3 | 320 | <3 | 140 | 470 | <1 |

[†]The adsorption study was conducted using 10 mL of 1250 ppb As(V) and samples shaken for 30 min. The pH of sample varied ±0.4.
[‡]0.1 and 0.2 represent the molar ratio of Mn/(Mn + Fe).
[§]0.04 represents Si/Fe molar ratio.

Figure 6:
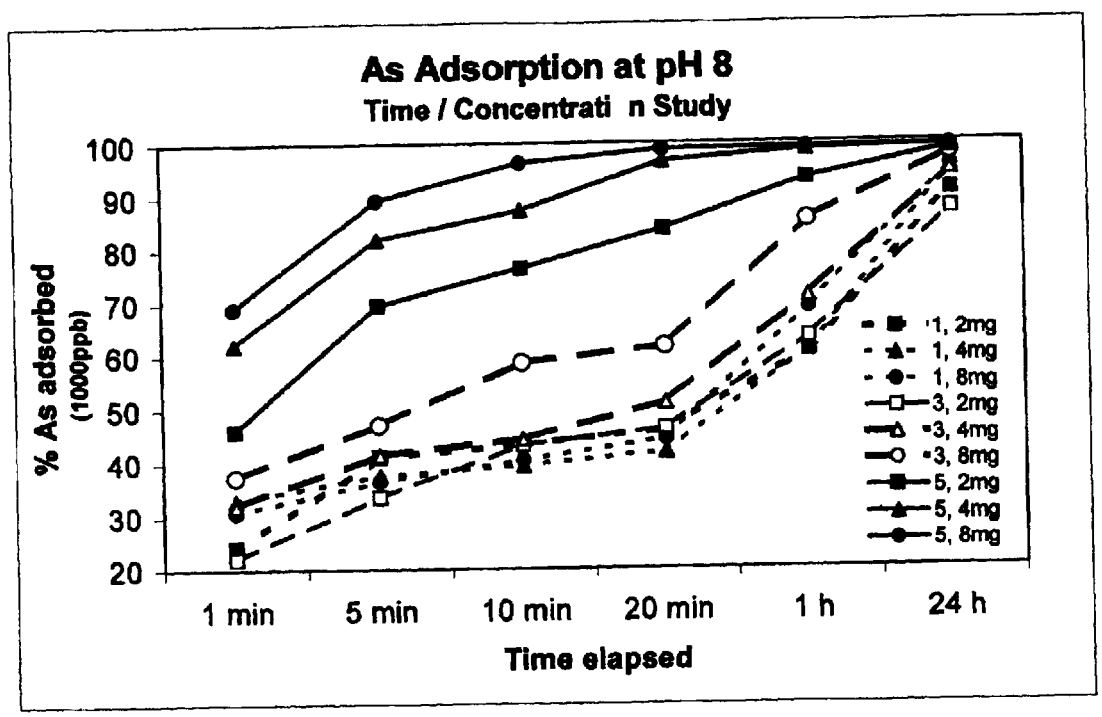
FIG. 6 shows a plot of percent arsenic adsorbed versus time elapsed for selected oxides with different amounts used in the study. The solid line represents 0.04 Si/Fe molar ratio ferrihydrite, and large and small dotted lines represent 0.1 and 0.2 Mn/(Mn+Fe) molar ratio ferrihydrite samples, respectively.

Kinetics and concentration study of As(V): This study was initiated to understand the effect of oxide concentrations on arsenic adsorption. Additionally, a consulting company that deals with water quality in public water systems suggested that the arsenic adsorption should be rapid and ideally, take place in less than 30 min. Therefore, 2, 4 and 8 mg of oxides were treated with 10 mL of 1280 ppb of As(V) at pH 8 for various time intervals, i.e., 1 to 1440 min (24 hrs) (FIG. 6). The result indicates that 8 mg of 0.04 Si/Fe molar ratio ferrihydrite sample adsorbed 100 percent of As(V) in 20 mins (Table 7). All the Si containing samples adsorbed >90% As(V) in 60 min.

TABLE 7

Adsorption of As(V) by Mn- and Si-ferrihydrite samples[†]

| | | Time (min) | | | | | |
|---|---|---|---|---|---|---|---|
| Sample | Weight mg | 1 | 5 | 10 | 20 | 60 | 1440 |
| | | | | | ppb | | |
| 0.1 Mn Ferrihydrite[‡] | 2 | 980 | 760 | 730 | 690 | 600 | 120 |
| 0.1 Mn Ferrihydrite[‡] | 4 | 860 | 800 | 780 | 750 | 500 | 60 |
| 0.1 Mn Ferrihydrite[‡] | 8 | 890 | 800 | 770 | 720 | 400 | 600 |
| 0.2 Mn Ferrihydrite[‡] | 2 | 1000 | 850 | 730 | 690 | 370 | 700 |
| 0.2 Mn Ferrihydrite[‡] | 4 | 871 | 750 | 720 | 630 | 370 | 690 |
| 0.2 Mn Ferrihydrite[‡] | 8 | 800 | 680 | 530 | 490 | 190 | 30 |
| 0.04 Si-Ferrihydrite[§] | 2 | 670 | 500 | 300 | 200 | 90 | 20 |
| 0.04 Si Ferrihydrite[§] | 4 | 560 | 230 | 190 | 50 | 20 | <3 |
| 0.04 Si Ferrihydrite[§] | 8 | 300 | 130 | 40 | <3 | <3 | <3 |

Figure 7:
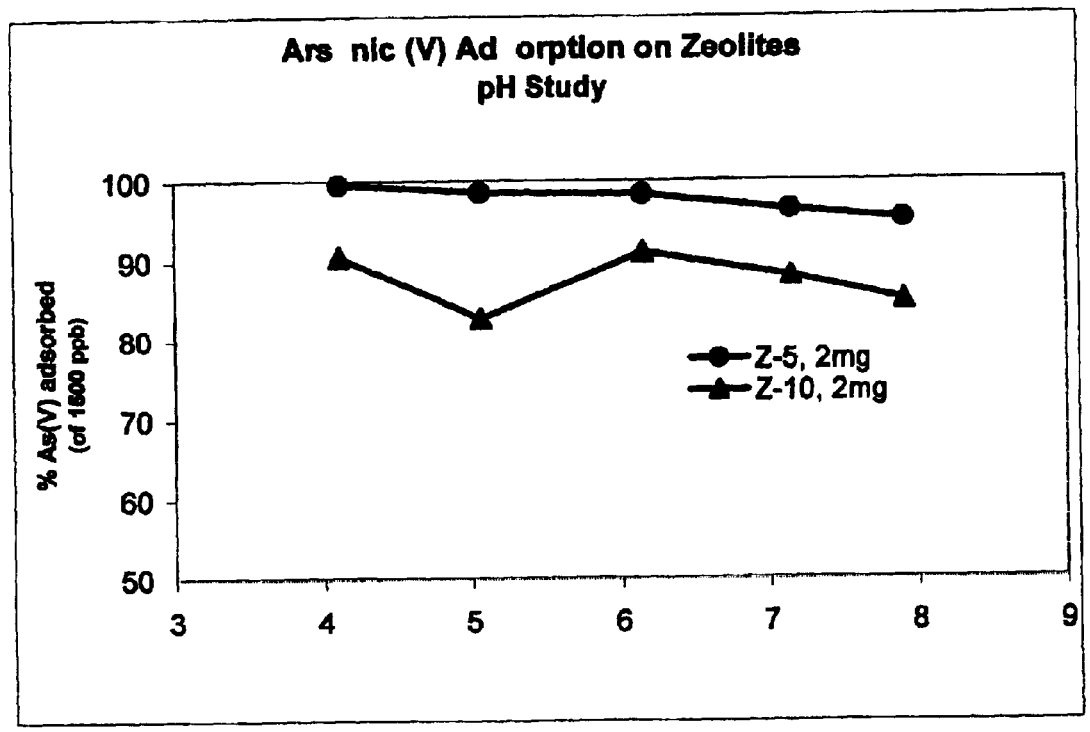
FIG. 7 shows a plot of percent arsenic adsorbed versus pH for natural zeolite coated with nanophase Mn—Fe oxide (NZNPF). The (●) and (▲) represent 5% and 10% NZNPF, respectively.

[†]Adsorption study conducted at pH 8 using 1,280 ppb As(V) solution.
[‡]0.1 and 0.2 represent Mn/(Mn + Fe) molar ratio
[§]0.04 is the Si/Fe molar ratio Natural zeolite coated nanophase Mn—Fe oxide (NZNPF): Zeolites were coated with nanophase Mn—Fe oxide (NZNPF) for the following reasons: (1) NZNPF simultaneously remove As(III) and As(V) from contaminated waters, wherein Mn in the Fe oxide oxidizes As(III) to As(V) in contaminated waters, and Fe oxide adsorbs As(V), and Fe and Mn(II) ions released during the reduction-dissolution of As(III) by Mn present in the Fe oxide structure; (2) it is effective at all pHs (4 to 9) because zeolites are good buffers; (3) zeolite assists in settling the particles in settling ponds or increases water flow; (4) the sludge created is non-hazardous and easy to be disposed of by stabilization and solidification of the contaminated sludge using lime/cement; and (5) for developing filter system for household use. NZNPF is ideal as the buyer need not worry about the oxidation states of arsenate.

pH versus As(V) adsorption: The adsorption study was conducted using 2 mg of the natural zeolite coated with 5% and 10% nanophase Mn—Fe oxide. The Mn/(Mn+Fe) molar ratio in both samples was 0.1. The samples were shaken gently using 10 mL of 1.57 mg L$^{-1}$ solution for 30 min. The 5% Mn—Fe oxide coated zeolite effectively reduced the As(V) concentration from 1500 ppb to <5 ppb in the pH range of 4 to 7; but at pH 7.9 the concentration of arsenic was 18 ppb (concentration above the new arsenic MCL) (Table 8). In other words, 5% Mn-Feoxide zeolite can reduce the concentration of arsenic to current permissible levels of 10 ppb up to pH 7 (Table 8). However, for pH>8, the anticipated increase in arsenate can be reduced using more sample size. The amount of arsenate adsorbed per gram of the oxide are listed in parenthesis. The percent arsenate adsorbed versus pH is plotted in FIG. 7.

TABLE 8 pH versus As(V) adsorption by zeolite coated with nanophase Mn—Fe oxides[†]

| | pH | | | | |
|---|---|---|---|---|---|
| Sample | 4.11 | 5.06 | 6.15 | 7.15 | 7.91 |
| | | | ppb | | |
| 5% Mn—Fe Coated Zeolite[‡] | <3(6.1) | 20(7.4) | 20(7.7) | 50(6.4) | 180(7.1) |
| 10% Mn—Fe Coated Zeolite[‡] | 140(6.1) | 260(5.7) | 130(6.7) | 180(5.8) | 9220(6.0) |

Figure 8:
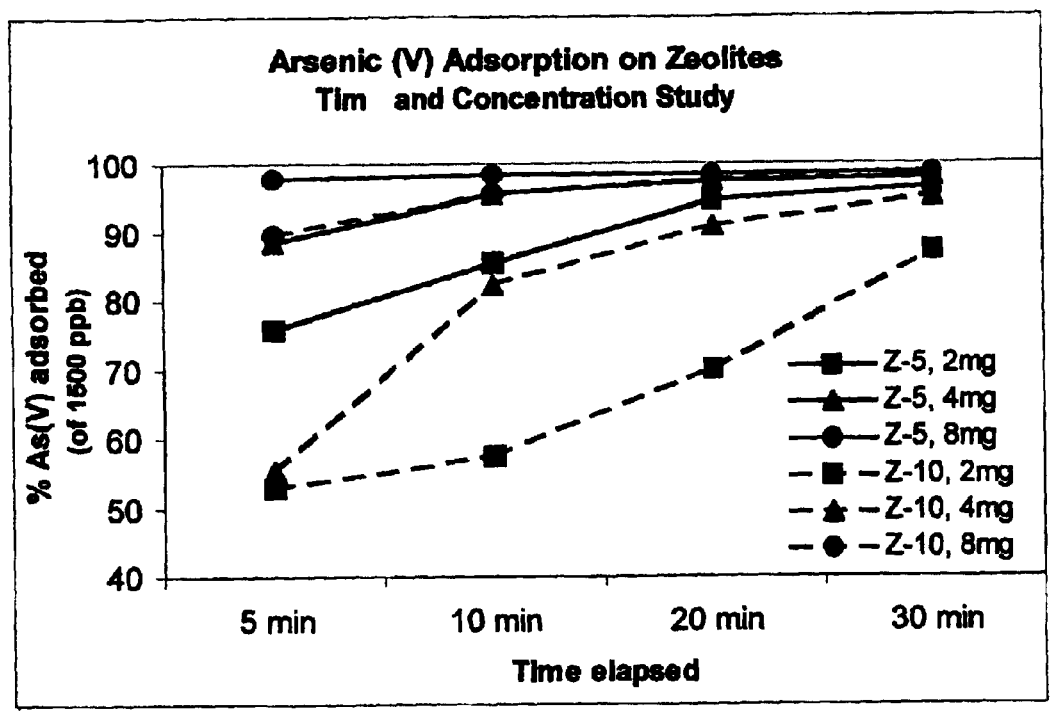
FIG. 8 shows a plot of percent arsenic adsorbed versus time elapsed for natural zeolite coated with nanophase Mn—Fe oxide (NZNPF) with different amounts of oxide. The solid and dotted lines represent 5% and 10% NZNPF, respectively.

[†]Adsorption study was conducted using 10 mL of 1570 ppb solution, 2 mg of samples and samples shaken for 30 mins.
[‡]Mn and Fe were in the ratio of 0.1 molar Mn/(Mn + Fe).
The values in the parentheses are the amount of mg arsenate adsorbed per g of the material Time versus As(V) adsorption: The adsorption study on natural zeolite coated with 5% and 10% nanophase Mn—Fe oxide (NZNPF) was conducted using 10 mL of 1570 ppb solution at pH 7.93. The amounts of NZNPF used in this study were 2, 4 and 8 mg. Both 5% and 10% NZNPF samples decreased the As(V) levels from 1570 ppb to <10 ppb in 30 min (Table 9 and FIG. 8). Also, the amount of arsenate adsorbed (shown in parentheses) decreased with the increasing oxide content (Table 9). The 8 mg of 5% NZNPF and 10% NZNPF effectively reduced arsenic levels in 5 min and 10 min, respectively. The NZNPF samples reduced the As(V) content to <10 ppb.

TABLE 9

Time versus As(V) adsorption by the nanophase Mn—Fe oxide coated zeolites[†]

| | | Time (Min) | | | |
|---|---|---|---|---|---|
| Sample | Amount mg | 5 | 10 | 20 | 30 |
| | | ppb | | | |
| 5% Mn—Fe Coated Zeolite[‡] | 2.0 | 380(5.4) | 230(6.1) | 90(6.7) | 60(6.8) |
| 5% Mn—Fe Coated Zeolite[‡] | 4.0 | 180(3.4) | 70(6.7) | 40(3.7) | 30(3.7) |
| 5% Mn—Fe Coated Zeolite[‡] | 8.0 | 40(1.9) | 30(1.9) | 20(1.9) | 20(1.9) |
| 10% Mn—Fe Coated Zeolite[‡] | 2.0 | 740(4.2) | 67(4.5) | 47(5.5) | 20(6.8) |
| 10% Mn—Fe Coated Zeolite[‡] | 4.0 | 700(2.9) | 28(3.3) | 150(3.7) | 80(3.8) |
| 10% Mn—Fe Coated Zeolite[‡] | 8.0 | 160(1.7) | 71(1.8) | 40(1.9) | 30(1.9) |

[†]Adsorption study was conducted using 10 mL of 1570 ppb solution at pH 7.93.
[‡]Mn and Fe were in the ratio of 0.1 molar Mn/(Mn + Fe).
The values in the parentheses are the amount of mg arsenate adsorbed per g of the material.

As(V) adsorption on Si ferrihydrite (50 and 1500 ppb): The adsorption study on 0.04 Si/Fe ferrihydrite sample was conducted at pH 7.91 using 10 mL of 50 ppb and 1,500 ppb As(V) solutions and the suspension shaken for 30 mins. The Si-ferrihydrite was able to reduce up to 1,500 ppb of As(V) solution to <10 ppb. However, the adsorption of As(V) resulted in release of Si into the solution. This may be due to the fact that some of the As(V) may be replacing Si from the ligand adsorption site (Table 10).

TABLE 10

As(V) adsorption by Si-ferrihydrites[†]

| Sample | As Concentration | As Solution | Si Solution | As Adsorbed | Si Desorbed |
|---|---|---|---|---|---|
| | | | ppb | | |
| Si Ferrihydrite[‡] | 50 | 5 | 21 | 60 | 20 |
| Si-Ferrihydrite[‡] | 1500 | 9 | 36 | 1930 | 40 |

[†]The adsorption study was conducted at pH 7.91 using 10 mL of the known solution and suspension shaken gently for 30 mins.
[‡]The Si/Fe molar ratio of the sample is 0.04.

As(III) oxidation and A(V) adsorption on 5% amd 10% NZNPF samples: The As(III) and As(V) adsorption study was conducted with 5% and 10% NZNPF to determine their effectiveness in: 1) oxidizing As(III) to As(V) and finally adsorption of the released oxidized As(V) species, and 2) adsorbing the native As(V) species present in contaminated waters. Additionally, the release of Fe and Mn was determined. The adsorption study was performed by shaking 8 mg of sample with 10 ml of known amount of arsenic concentration and species for 30 min at pH 8 (±0.2).

Both the zeolite coated samples removed 53 ppb of As(III) from the solution (Table 11) but not 1,150 ppb As(III). However, the Fe and Mn released into solution was close to the MCL. In case the contaminated water contains 1,150 ppb of As(III), then a higher amount of NZNPF needs to be used to comply with the new regulation. Whereas, 5% Mn—Fe oxide coated zeolite was effective in removing As(V) at both 50 and 1,150 ppb concentration levels. However, the 10% Mn—Fe oxide coated sample was effective in removing 53 ppb of As(V) but not the 1,150 ppb.

TABLE 11

As(III) and As(V) adsorption on zeolite coated with nanophase Mn—Fe oxides (NZNPF)[†]

| Sample | Concentration Initial ppb | As Final ppb | Fe Final ppb | Mn Final ppb | As Adsorbed mg g$^{-1}$ | Fe Adsorbed mg g$^{-1}$ | Mn Adsorbed mg g$^{-1}$ |
|---|---|---|---|---|---|---|---|
| As(III) | | | | | | | |
| 5% Mn—Fe Coated Zeolite[‡] | 53 | — | 309 | 28 | 0.06 | 0.27 | 0.02 |
| 5% Mn—Fe Coated Zeolite[‡] | 1,150 | 109 | 382 | 39 | 1.25 | 0.47 | 0.05 |
| 10% Mn—Fe Coated Zeolite[‡] | 53 | — | 282 | 39 | 0.06 | 0.34 | 0.05 |
| 10% Mn—Fe Coated Zeolite[‡] | 1,150 | 116 | 134 | 108 | 1.23 | 0.17 | 0.13 |
| As(V) | | | | | | | |
| 5% Mn—Fe Coated Zeolite[‡] | 53 | — | 151 | 16 | 0.06 | 0.16 | 0.02 |
| 5% Mn—Fe Coated Zeolite[‡] | 1,150 | — | 403 | 40 | 1.43 | 0.49 | 0.05 |
| 10% Mn—Fe Coated Zeolite[‡] | 53 | — | 365 | 30 | 0.06 | 0.43 | 0.04 |
| 10% Mn—Fe Coated Zeolite[‡] | 1,150 | 43 | 732 | 175 | 1.38 | 0.92 | 0.29 |

[†]8 mg of samples was shaken for 30 min using 10 ml of known amount of arsenate concentration at pH 8 (±0.2).
[‡]Mn/(Mn + Fe) molar ratios in the 5% and 10% coated zeolite were 0.1.
— Below the instrument detection limits of <3 ppb.

As(III) and A(V) adsorption on 0.25% and 1% NZNPF samples: The adsorption study was conducted on natural zeolite coated with 0.25 and 1% nanophase Mn—Fe oxide samples. The synthesis was perfomed to match commercial manufacturing process, in that the equilibration was reduced to 30 mins and the samples filtered using Whatman 41 and distilled water. Also, the amount of oxide was reduced to give a good flow rate.

This study demonstrated that using 200 mg of natural zeolite coated with 1% nanophase Mn—Fe oxide both the concentrations of As(III) and As(V) containing 50 ppb were reduced to <3 ppb, which is below the instrument's detection limit (Table 12). Furthermore, concentrations of Fe and Mn released into the solution were within the Safe Drinking Water Act secondary limits of 300 ppb for Fe and 50 ppb for Mn. Therefore, this oxide coated natural zeolite sample can be used for developing filter.

TABLE 12

Arsenic(III) and As(V) adsorption on zeolite coated with nanophase Mn—Fe oxides[†]

| Sample | Concentration ppb | Sample Size mg | As ppb | Fe ppb | Mn ppb |
|---|---|---|---|---|---|
| As(III) | | | | | |
| 0.25% Mn—Fe Coated T-Zeolite[‡] | 57 | 8.1 | 40 | 217 | 10 |
| 0.25% Mn—Fe Coated T-Zeolite[‡] | 1,127 | 8.2 | 1095 | 329 | 14 |
| 0.25% Mn—Fe Coated T-Zeolite[‡] | 57 | 50.3 | 18 | 876 | 34 |
| 0.25% Mn—Fe Coated T-Zeolite[‡] | 1,127 | 50.3 | 688 | 1,095 | 41 |
| 1% Mn—Fe Coated T-Zeolite[‡] | 57 | 8.2 | 30 | 5 | — |
| 1% Mn—Fe Coated T-Zeolite[‡] | 1,127 | 8.2 | 8410 | 7 | — |

TABLE 12-continued

Arsenic(III) and As(V) adsorption on zeolite coated with nanophase Mn—Fe oxides[†]

| Sample | Concentration ppb | Sample Size mg | As | Fe ppb | Mn |
|---|---|---|---|---|---|
| 1% Mn—Fe Coated T-Zeolite[‡] | 57 | 50.1 | 37 | 17 | — |
| 1% Mn—Fe Coated T-Zeolite[‡] | 1,127 | 50.1 | 883 | 19 | — |
| 1% Mn—Fe Coated T-Zeolite[‡] | 54 | 202.3 | — | 136 | 9 |
| 1% Mn—Fe Coated S-Zeolite | 48 | 505.0 | — | 10 | 37 |
| As(V) | | | | | |
| 0.25% Mn—Fe Coated T-Zeolite[‡] | 50 | 8.2 | 33 | 246 | 11 |
| 0.25% Mn—Fe Coated T-Zeolite[‡] | 1,130 | 8.2 | 934 | 429 | 17 |
| 0.25% Mn—Fe Coated T-Zeolite[‡] | 50 | 50.2 | 5 | 902 | 35 |
| 0.25% Mn—Fe Coated T-Zeolite[‡] | 1,130 | 50.7 | 705 | 1,215 | 50 |
| 1% Mn—Fe Coated T-Zeolite[‡] | 50 | 8.4 | 35 | 6 | — |
| 1% Mn—Fe Coated T-Zeolite[‡] | 1,130 | 8.3 | 918 | 8 | — |
| 1% Mn—Fe Coated T-Zeolite[‡] | 50 | 50.3 | 14 | 20 | — |
| 1% Mn—Fe Coated T-Zeolite[‡] | 1,130 | 50.0 | 790 | 28 | 8 |
| 1% Mn—Fe Coated T-Zeolite[‡] | 54 | 200.6 | — | 108 | 7 |
| 1% Mn—Fe Coated S-Zeolite | 48 | 504.0 | — | 11 | 12 |

[†]The samples were treated with 10 mL solution and shaken gently for 30 min.
[‡]The Mn/(Mn + Fe) molar ratios in the 0.25% and 1% coated zeolite were 0.1.
— Below the instrument detection limits.
T-zeolite and S-zeolite represents zeolite mined from Tilden, TX and Socorro, NM, respectively.

Toxicity Characteristics Leaching Procedure (TCLP) test results of natural zeolite coated with 1% Mn—Fe oxides: TCLP was performed on the 1% NZNPF treated with 50 ppb As(III) and As(V) for the Tilden, Tex. and Socorro, N. Mex. The adsorption of As(III) and As(V) (using 50 ppb of arsenate and treated with 200 mg of NZNPF) on the material was calculated to be 0.0025 mg/g (Table 12). A modified TCLP test on the Tilden, Tex. and Socorro, N. Mex. zeolites showed that <75 ppb of arsenate was present in both the Na-acetate extracts, thus suggesting that the arsenate adsorbed samples were non hazardous. The present TCLP limit for As is 5,000 ppb. Therefore, materials can be safely disposed of in a non-hazardous landfill, thus saving considerable amount of money to the Public Water System (PWS).

EXAMPLE 12
Scale Up of Synthesis of NZNPF and Characterization

Figure 9:
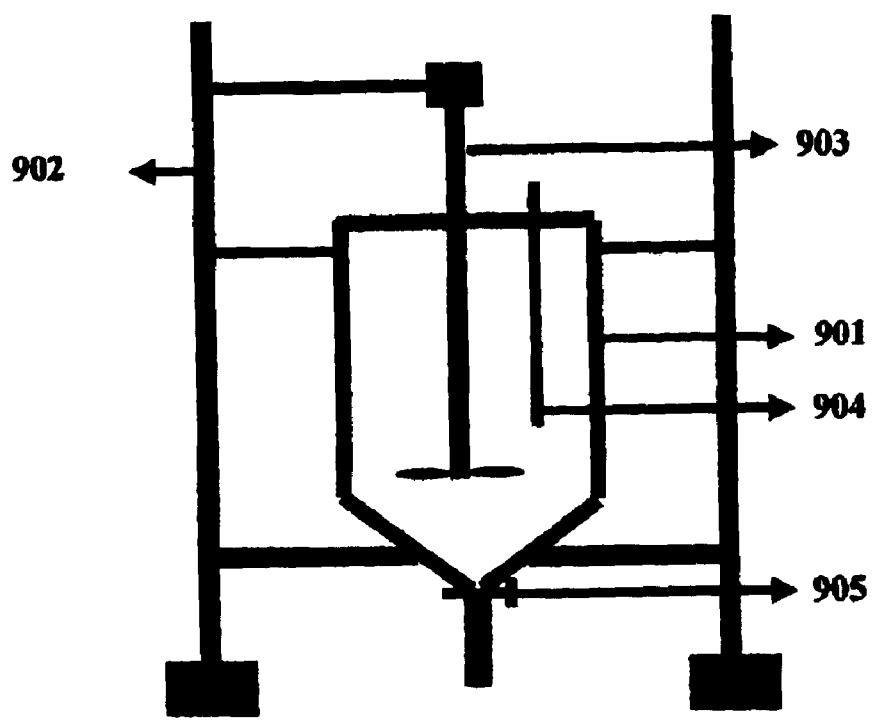
FIG. 9 is a schematic drawing of the reaction vessel for manufacturing natural zeolite coated with nanophase Mn—Fe oxide (NZNPF).
Figure 10:
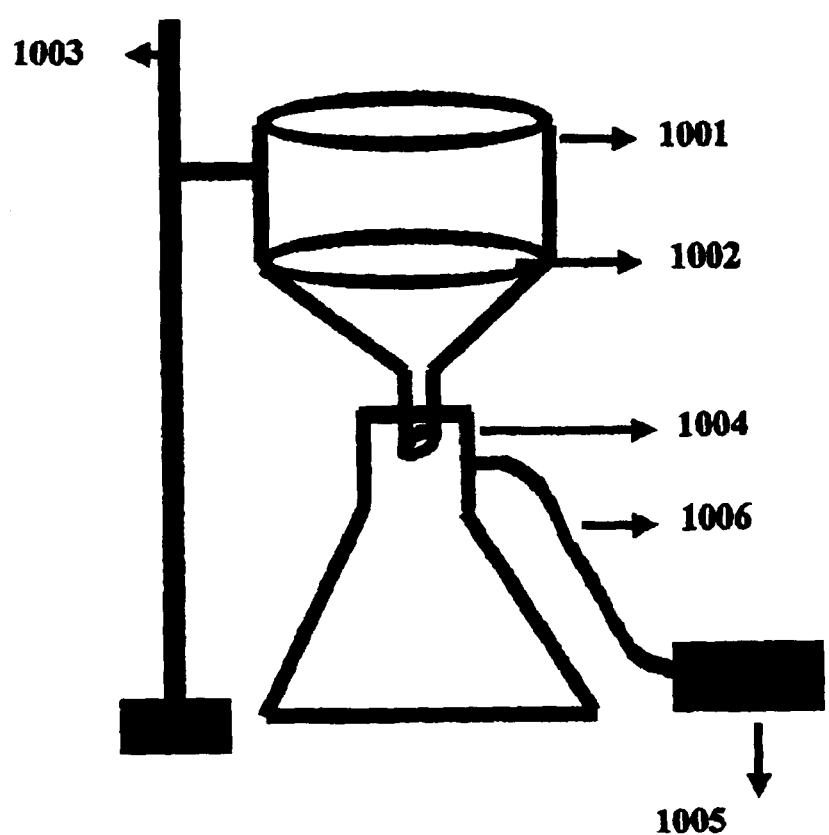
FIG. 10 is a schematic drawing of the filtration unit for pilot-scale natural zeolite coated with nanophase Mn—Fe oxide (NZNPF).
Figure 11:
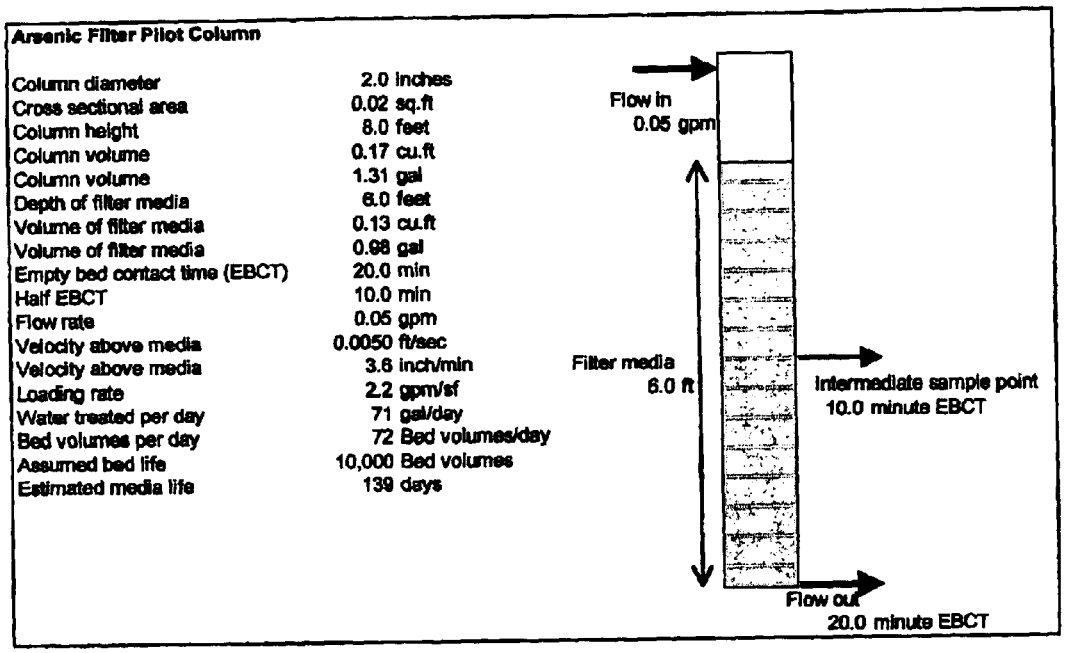
FIG. 11 is a schematic drawing of the pilot filter column.

The schematics of the set up is given in FIG. 9. The reaction vessel 901 is attached to a stand 902 for support and an agitator 903 is fitted so that the material can be stirred thoroughly. Also, the lid has an opening to insert pH meter 904 to maintain the pH of 7. The bottom contains a drain plug 905 to remove the synthesized material. The suspension is then vacuum filtered via a filtration unit (FIG. 10), which comprises funnel 1001 with Whatman 41 filter paper 1002, a stand 1003 for supporting the funnel and a side arm flask 1004 connected to a vacuum pump 1005 through a tube 1006. After filtration, the suspension is washed with distilled water to remove excess salts. FIG. 11 is a process diagram for commercially manufacturing NZNPF.

The pilot-scale synthesis will simulate actual commercial operations. In a 10 gallon reaction vessel, 20 L of 50 g Fe (in the form of $FeCl_3$) with Fe/(Fe+Mn) molar ratio of 0.1, will be introduced. The solution will be stirred for 5 min for proper mixing of the solution, then, 5 kg of natural zeolite will be added. The particle can be in any size, preferably, from 0.1 mm to 1.4 mm. The suspension will be raised to pH 7 using NaOH. After the desired pH is reached, the suspension will be allowed to equilibrate for 30 min. The pH will be measured again and adjustment made accordingly. The suspension will be vacuum filtered using Whatman 41 filter paper and washed with distilled water to remove excess salts. The sediment will then be dried at 80° C.

EXAMPLE 13
Pilot-Scale Arsenic Adsorption Study

A pilot-scale filter will be used to demonstrate the effectiveness of the 1% NZNPF media for arsenic removal (both As(III) and As(V) will be tested) using a fixed bed filter unit. Potable water spiked with 50 ppb arsenate will be batch made and pumped through the pilot column at a fixed flow rate. Daily samples will be taken for analysis of arsenate removal. The primary issues to be investigated in the pilot study are: arsenate adsorption versus empty bed contact time (EBCT); arsenate adsorption versus bed life; life of filter bed (in bed volumes); release of Fe or Mn into finished water; headloss versus flow rate; total headloss versus elapsed time; and any unforeseen operating problems.

Figure 12:
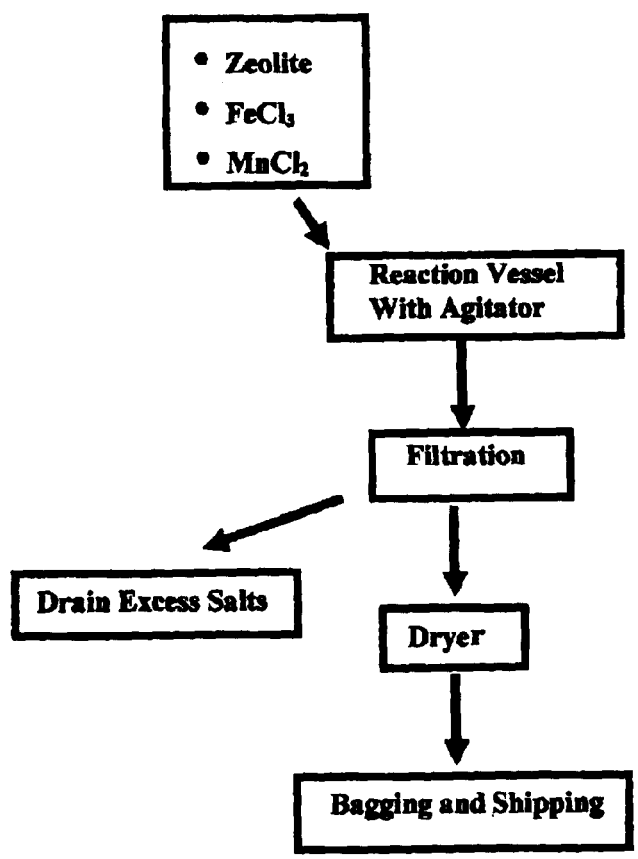
FIG. 12 is a process diagram for commercially manufacturing natural zeolite coated with nanophase Mn—Fe oxide (NZNPF).

FIG. 12 summarizes the design parameters of the pilot filter column. A 2-inch diameter column with 0.13 cubic feet of 1% NZNPA media will provide a total EBCT of 20 minutes at the design flow rate. A sample point at mid-depth of the media will provide test data for a 10 minute EBCT. Other intermediate sample taps will also be provided to allow sampling at other locations in the media to monitor arsenic removal through the bed depth.

The source of As-contaminated water will be potable water spiked with 50 ppb of As. The water will be batch mixed in a holding tank. A variable-speed peristaltic metering pump will be used to feed the source water at a fixed rate through the filter bed. The head loss across the filter bed will be monitored by measuring the differential pressure across the filter. The filter media will not be backwashed. The filter is designed to be used for groundwater contaminated with arsenic. By not using backwashing or media regeneration, the filter vessel will be a simple tank with no mechanical equipment and no waste stream.

EXAMPLE 14
Concentration and Speciation Determination

Both online hydride generation ICP-MS and ultrasonic nebulizer ICP-OES are used to determine arsenic concentrations in all samples. The more sensitive ICP-MS technique will be used for the lower concentration samples. This technique is highly sensitive and extremely robust (Klaue and Blum, 1999). Samples are first mixed with 1 M $HNO_3$, and then combined with 1% $NaBH_4$ in a glass reaction chamber. Arsine gas ($AsH_3$) is generated, and then swept through a teflon desolvation membrane into the argon plasma of the ICP-MS instrument. The detection limit is <3 ppb, significantly lower than the practical quantitation limit (PQL) achievable by most other laboratories.

Using the hydride generation technique, the speciation of arsenic can also be determined. The two inorganic species of arsenic have different kinetics of arsine generation. As(III) produces arsine approximately 3 times more readily than As(V). This difference is utilized to determine the arsenic speciation by running a sample twice. Once without any treatment, for the mixed As(III)/As(V) response, and then a second time after complete oxidation of As(III) to As(V) with either $H_2O_2$ or UV-irradiation. This method has been utilized with successful results for total arsenate concentrations above 1 ppb.

In certain cases where organic arsenate species are suspected to be present, the waters can be analyzed using anion-exchange chromatography to separate all organic and inorganic arsenate species before introduction into the hydride generator. This method involves significantly more resources and time to complete per sample (15 minutes compared to 4 minutes for the previous method).

In summary, the zeolite coated with nanophase Mn—Fe oxide (NZNPF) in the present invention has following advantages compared to the products that are available in the market: (1) Mn-substituted nanophase Fe oxide can remove both As(III) and As(V) from contaminated waters; (2) effective at all pHs (4 to 9) and adsorption occurs in 30 min; (3) the amount of Mn and Fe released to water will decrease significantly; thus maintain aesthetics of water; (4) better water flow rate is anticipated due to less oxides, resulting in low headloss and reduced clogging of fixed bed filter media; (5) for surface water treatment plants, zeolite will assist in settling the particles in settling ponds; (6) suitable for use on a point-of-use filter system for household use; (7) reduced cost of the filter media material; (8) for surface water treatment plants, no additional investments need to be made to build new infrastructure since the NZNPF material can be fed into the existing coagulation process; and (9) the As containing sludge can be easily handled and disposed of in non-hazardous landfill site, saving considerable amount of money to Public Water System.

While the invention has been shown in several of its forms, it is not thus limited but is susceptible to various changes and modifications without departing from the spirit thereof.

What is claimed is:

1. A method of removing As(III) and As(V) from arsenic-contaminated waters, comprising the steps of:
   (a) contacting the arsenic-contaminated waters with a zeolite adsorbent coated with nanophase Mn—Fe oxide, wherein Mn containing oxide in said adsorbent oxidizes As(III) to As(V), wherein oxidized and native As(V) is adsorbed by Fe oxide in said adsorbent for subsequent removal; and
   (b) removing the oxidized and native As(V) from said waters.

2. The method of claim 1, wherein the adsorption is performed at the pH range from about 4 to about 9.

3. The method of claim 1, wherein the resulting waters comprise less than 3 ppb of As(III) and/or As(V).

4. The method of claim 1, wherein said waters are ground waters or surface waters.

5. A method of removing arsenic having various valence states from arsenic-contaminated waters, comprising the steps of:
   (a) using a zeolite adsorbent coated with nanophase Mn—Fe oxide to oxidize arsenic having lower valence states to arsenic having higher valence states in said arsenic-contaminated waters; and
   (b) removing the oxidized and native arsenic having higher valence states from said waters by said adsorbent.

6. The method of claim 5, wherein said arsenic-contaminated waters comprise As(III) and As(V).

7. A method of removing arsenic having various valence states from arsenic contaminated waters, comprising the steps of:
   (a) oxidizing the arsenic having lower valence states to arsenic having higher valence states in said arsenic-contaminated waters; and
   (b) removing the oxidized and native arsenic having higher valence states from said waters;
   wherein said arsenic having lower valence states is oxidized by a Mn-containing oxide;
   wherein said Mn-containing oxide is selected from the group consisting of birnessite, Si-birnessite, Mn-ferrihydrite and zeolite coated with nanophase Mn—Fe oxide.

8. The method of claim 7, wherein said oxidized and native arsenic having higher valence states is adsorbed and removed by a Mn-containing Fe oxide.

9. The method of claim 8, wherein the adsorption is performed at the pH range from about 4 to about 9.

10. The method of claim 8, wherein the resulting waters comprise less than 3 ppb of As(III) and As(V).

11. The method of claim 8, wherein said waters are ground waters or surface waters.

* * * * *